United States Patent
Wu et al.

(10) Patent No.: US 12,353,721 B2
(45) Date of Patent: Jul. 8, 2025

(54) METHOD, ELECTRONIC DEVICE, AND COMPUTER PROGRAM PRODUCT FOR PROCESSING KEY-VALUE DATA

(71) Applicant: Dell Products L.P., Round Rock, TX (US)

(72) Inventors: Aaron Wu, Shanghai (CN); Xiao Le Shang, Shanghai (CN); Wesley Wei Sun, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 90 days.

(21) Appl. No.: 18/486,028

(22) Filed: Oct. 12, 2023

(65) Prior Publication Data

US 2025/0036287 A1 Jan. 30, 2025

(30) Foreign Application Priority Data

Jul. 28, 2023 (CN) .......................... 202310945414.0

(51) Int. Cl.
*G06F 3/06* (2006.01)
(52) U.S. Cl.
CPC .......... *G06F 3/0613* (2013.01); *G06F 3/0653* (2013.01); *G06F 3/0685* (2013.01)

(58) Field of Classification Search
CPC ..... G06F 3/0613; G06F 3/0653; G06F 3/0685
See application file for complete search history.

(56) References Cited

U.S. PATENT DOCUMENTS

| | | | |
|---|---|---|---|
| 11,093,468 B1* | 8/2021 | Bent | G06F 16/27 |
| 2022/0188195 A1* | 6/2022 | Brenner | G06F 3/0685 |
| 2023/0409212 A1* | 12/2023 | Avraham | G06F 3/0644 |

\* cited by examiner

*Primary Examiner* — Jason W Blust
(74) *Attorney, Agent, or Firm* — Amin, Turocy & Watson, LLP

(57) ABSTRACT

Key-value data is processed. An example method includes acquiring key-value data, including key data and value data, and a storage level corresponding to the key-value data and indicating a storage performance level of a memory in a storage system. In response to the storage level being a first level higher than a second level, the key-value data is stored in a primary storage tree in a first memory. In response to the storage level being the second level, the key data is stored in the primary storage tree, and the key-value data is stored in a secondary storage tree in a second memory. Beneficially, associations can be established between different memories in the storage system through the key data using fast positioning of all the key-value data implemented through memories with high storage performance. Further, the efficiency of data processing in the storage system is thereby improved.

20 Claims, 9 Drawing Sheets

METHOD, ELECTRONIC DEVICE, AND COMPUTER PROGRAM PRODUCT FOR PROCESSING KEY-VALUE DATA

RELATED APPLICATION

The present application claims the benefit of priority to Chinese Patent Application No. 202310945414.0, filed on Jul. 28, 2023, which application is hereby incorporated into the present application by reference herein in its entirety.

TECHNICAL FIELD

Embodiments of the present disclosure relate to the field of storage systems, and particularly, to a method, an electronic device, and a computer program product for processing key-value data.

BACKGROUND

With the increasing demand of users for data storage, more and more memories are included in a storage system to meet the needs of users. At least one user of the storage system can process data, such as Key-Value (KV) data, through the storage system. For example, the at least one user can perform processing operations such as storing (or writing), reading, deleting, or editing on the key-value data. The data may be stored in different memories of the storage system, and these memories may be memories of the same type or different types.

SUMMARY

The following presents a simplified summary of the disclosed subject matter in order to provide a basic understanding of some example embodiments of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

The embodiments of the present disclosure provide a method, an electronic device, and a computer program product for processing key-value data.

According to a first example embodiment of the present disclosure, a method for processing key-value data is provided, including: acquiring key-value data and a storage level corresponding to the key-value data, wherein the key-value data comprises key data and value data, and the storage level indicates a storage performance level of a memory in a storage system; storing, in response to the storage level being a first level, the key-value data in a primary storage tree in a first memory of the storage system; and storing, in response to the storage level being a second level, the key data in the primary storage tree, and storing the key-value data in a secondary storage tree in a second memory of the storage system, wherein the first level is higher than the second level.

According to a second example embodiment of the present disclosure, an electronic device is provided, including: at least one processor; and a memory coupled to the at least one processor and having instructions stored thereon, wherein the instructions, when executed by the at least one processor, cause the electronic device to perform actions including: acquiring key-value data and a storage level corresponding to the key-value data, wherein the key-value data comprises key data and value data, and the storage level indicates a storage performance level of a memory in a storage system; storing, in response to the storage level being a first level, the key-value data in a primary storage tree in a first memory of the storage system; and storing, in response to the storage level being a second level, the key data in the primary storage tree, and storing the key-value data in a secondary storage tree in a second memory of the storage system, wherein the first level is higher than the second level.

According to a third example embodiment of the present disclosure, a computer program product is provided, the computer program product is tangibly stored on a non-volatile computer-readable medium and includes machine-executable instructions, and the machine-executable instructions, when executed, cause a machine to perform steps of the method in the first example embodiment of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, wherein identical reference numerals generally represent identical components in the example embodiments of the present disclosure.

In the various accompanying drawings, identical or corresponding reference numerals represent identical or corresponding parts.

DETAILED DESCRIPTION

Figure 1:
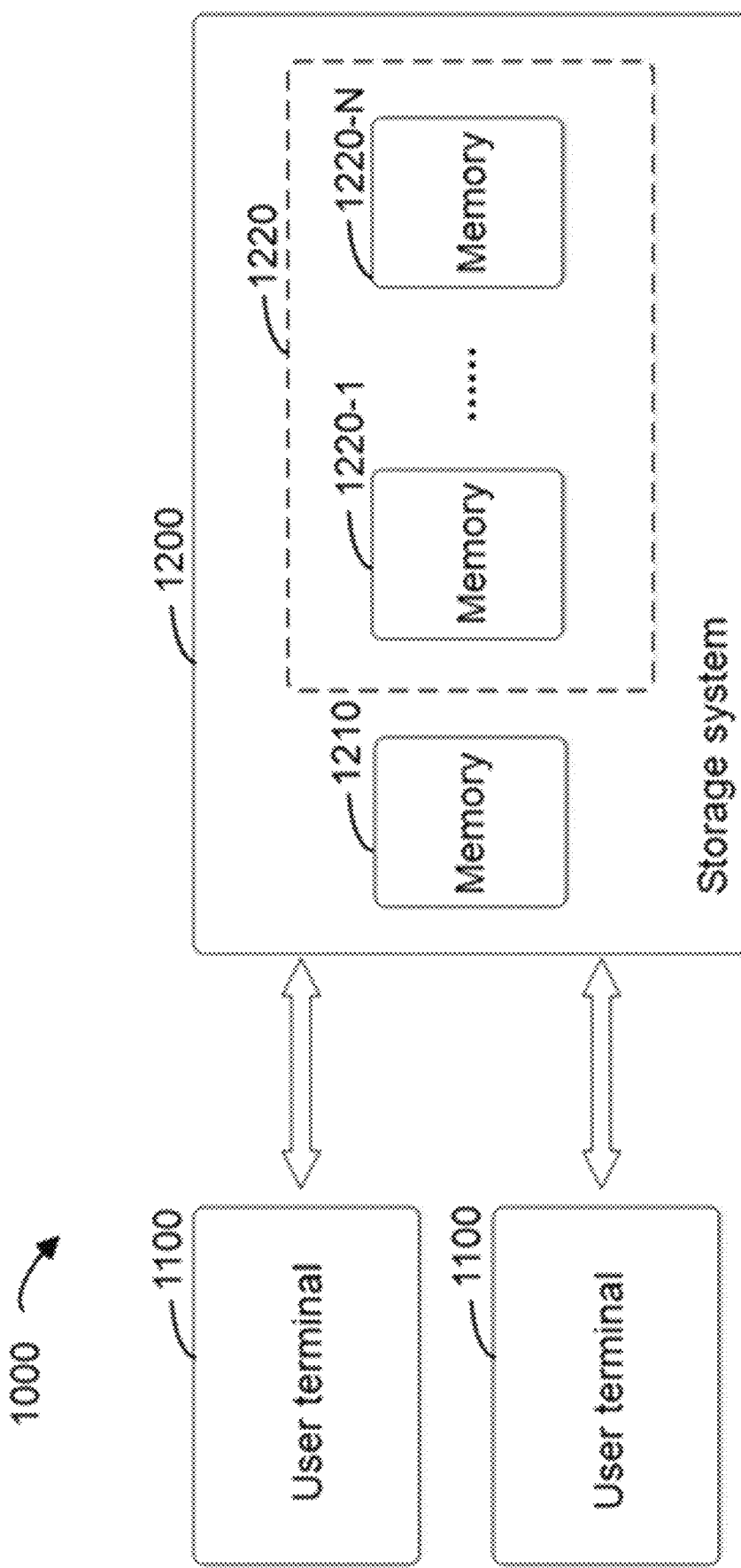
FIG. 1 shows a schematic diagram of an application environment of a storage system according to an embodiment of the present disclosure.

The embodiments of the present disclosure will be described in more detail with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In a storage system having a plurality of different memories, different key-value data may be stored in different memories. For example, key-value data that is frequently used (that is, hot data) may be stored in a memory with high storage performance (such as an NVMe memory), and key-value data that is not frequently used (that is, cold data) may be stored in a memory with low storage performance (such as an HDD memory). The key-value data is a data pair KV composed of key data K and value data V. The storage performance may refer to store (that is, write (PUT)), delete, read (GET), edit, search, or other access performance of a memory. A memory with high storage performance can efficiently process data, resulting in high user experience but also high cost. A memory with low storage performance has low efficiency in processing data and at the same time, has low cost.

The above method for storage of the key-value data aims to balance user experience and the storage system cost. However, memories in a storage system are independent of each other, each memory has its own independent storage logic, and a user who stores key-value data in the storage system may be different from a user who accesses the key-value data stored in the storage system. Therefore, the following cases may exist: The user accessing key-value data does not know in which memory the key-value data he/she needs to access is stored. Therefore, the user may issue, through a user terminal, a request to retrieve the required key-value data from all memories in the storage system, so that each memory in the storage system needs to perform a retrieval operation, which may result in a large amount of I/O costs, waste computing resources of the storage system, degrade the performance of the storage system, and make it difficult to achieve good user experience. Especially when the key-value data that the user expects to access is a column of key-value data (which includes a plurality of pieces of key-value data), the above problem will get worse, because the memory with a slow access speed may further increase the time required for retrieval.

In addition, in order to improve the processing efficiency for key-value data, all key-value data may also be stored in a memory with high storage performance. However, this may lead to unnecessary consumption of storage resources with high storage performance by "cold data", resulting in an increase in the cost of the storage system.

In the embodiments of the present disclosure, by providing a method, an electronic device, and a computer program product for processing key-value data, at least a part of the above disadvantages can be overcome. The method includes acquiring key-value data and a storage level corresponding to the key-value data. The key-value data includes key data and value data, and the storage level indicates a storage performance level of a memory in a storage system. The method further includes storing, in response to the storage level being a first level, the key-value data in a primary storage tree in a first memory of the storage system. The method further includes storing, in response to the storage level being a second level, the key data in the primary storage tree, and storing key-value data in a secondary storage tree in a second memory of the storage system, wherein the first level is higher than the second level. According to the method, associations can be established between different memories in the storage system through the key data, such that fast positioning of all the key-value data in the storage system can be implemented through memories with high storage performance, thereby improving the efficiency of data processing in the storage system.

FIG. 1 shows a schematic diagram of an application environment 1000 of a storage system according to an embodiment of the present disclosure. The application environment 1000 shown in FIG. 1 shows two user terminals 1100 (but may include one or more user terminals 1100) and a storage system 1200. Each user terminal 1000 may interact with the storage system 1200 to transmit commands or data (for example, key-value data KV, key data K, or the like). The storage system 1200 may include a plurality of memories 1210, 1220-1, . . . , and 1220-N, wherein N is an integer greater than or equal to 1. As an example, the memory 1210 may represent a memory with the highest storage performance, while the memory 1220 (which includes memories 1220-1, . . . , and 1220-N) may represent a memory with storage performance lower than that of the memory 1210. For example, the memory 1210 may be an NVMe memory, the memory 1220 may be an HDD memory or a memory of another type, and the memories 1220-1, . . . , and 1220-N may be memories of the same type or different types with different storage performance.

As an example, the storage system 1200 may process the key-value data according to a processing command received from any user terminal 1100, such as storing, deleting, reading, editing, or searching. In addition, in some embodiments, in addition to receiving the processing command, the storage system 1200 may further receive, from the user terminal 1100, key-value data KV to be stored or edited (for example, in a case of storing the key-value data or editing the key-value data), or receive key data K (for example, in a case of reading the key-value data, deleting the key-value data, or searching for the key-value data). An example of a method for processing key-value data according to an embodiment of the present disclosure is described in detail below with reference to FIG. 2A to FIG. 4.

Figure 2A:
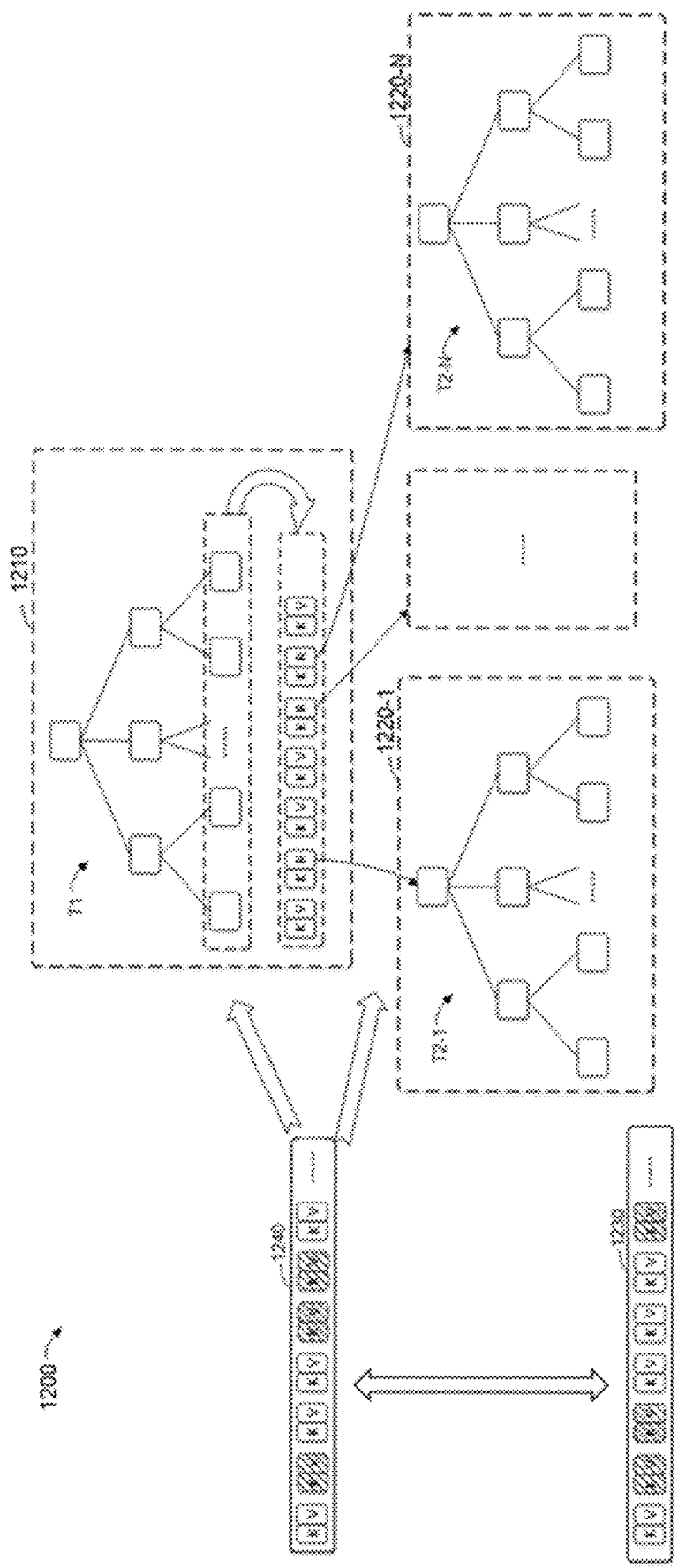
FIG. 2A shows a schematic block diagram of storing key-value data in a storage system according to an embodiment of the present disclosure.

FIG. 2A shows a schematic block diagram of storing key-value data KV in a storage system 1200 according to an embodiment of the present disclosure. FIG. 2A specifically shows an example of the storage system 1200 in FIG. 1. The storage system 1200 includes memories 1210, 1220-1, . . . , and 1220-N as described in FIG. 1. In the following text, for case of description, as an example, the memory 1210 with the highest storage performance is referred to as a first memory, and the memory 1220 with storage performance lower than that of the memory 1210 is referred to as a second memory. As an example, one or a plurality of memories 1220-1, . . . , and 1220-N included in the second memory 1220 are referred to as second sub-memories.

The first memory 1210 and the second sub-memories 1220-1, . . . , and 1220-N each have a storage tree for storing key-value data KV. For example, each storage tree is a B+ tree. A B+ tree is an m-ary tree with a variable but often large number of children per node. A B+ tree consists of a root, internal nodes and leaves. Copies of the key data are stored on internal nodes, the key-value data (or a data pair composed of the key data and other data) is stored on a leaf node, and the leaf node includes a pointer to the next leaf node to speed up sequential access. In this text, for ease of description and as an example, a storage tree T1 in the first memory 1210 is referred to as a primary storage tree, and storage trees T2-1, . . . , and T-N in the second sub-memories 1220-1, . . . , and 1220-N are referred to as secondary storage trees.

In some embodiments, the storage system 1200 may further have a write ahead log (WAL) file 1230 and an in-memory table 1240. As an example, the WAL file 1230 is append-only, and it can only sequentially write data, such as the key-value data KV or the key data K. The key-value data KV or the key data K received from the user terminal 1100 needs to be first written (that is, stored) into the WAL file 1230 before it can be used for accessing (such as storing, deleting, or editing) memories of the storage system. The WAL file 1230 may be used for fault or transaction recovery, that is, it may be used for playing back unprocessed key-value data in a case of power outage of the storage system, for continuing processing the key-value data. After completing the processing of all the key-value data, the data stored in the WAL file may be deleted to release the storage space. As an example, the WAL file may be stored in a predetermined non-volatile memory in the storage system, for example, stored on a disk. As an example, when the WAL file stores the received key-value data KV or key data K according to the receiving order, the in-memory table 1240 may store the same key-value data KV or key data K, but store them according to the order of the key data K, for improving the processing speed. Then, the sorted key-value data KV or key data K stored in the in-memory table 1240 may be used for accessing (such as storing, deleting, or editing) the memory 1210 or 1220. As an example, the in-memory table 1240 may be stored in a predetermined volatile memory in the storage system, such as an in-memory.

For example, in some embodiments, when the storage system 1200 receives from the user terminal 1100 the key-value data KV that needs to be stored in the storage system 1200, the key-value data KV may be stored in the WAL file 1230 and the in-memory table 1240, and then the key-value data KV is dumped from the in-memory table 1240 to the primary storage tree T1 of the first memory 1210, or dumped to the secondary storage trees T2-1, . . . , and T-N of the second memory 1220. In addition, in some embodiments, in order to reduce the I/O cost of the storage system 1200, the key-value data may be dumped in batches to the primary storage tree T1 or the secondary storage trees T2-1, . . . , and T-N when a dump condition is met (for example, the number of pieces of key-value data stored in the in-memory table reaches a predetermined threshold).

The storage processing of the key-value data is illustrated below by taking dumping of the key-value data in batches as an example. For example, in some embodiments, the storage system 1200 may sequentially receive a plurality of pieces of key-value data KV and their corresponding storage levels from any user terminal 1100, and the storage level may indicate the memory 1210 or 1220-1, . . . , and 1220-N where the corresponding key-value data KV specified by the user through the user terminal 1100 should be stored. The storage system 1200 stores the received key-value data KV in the WAL file 1230 according to a receiving order, and stores it in the in-memory table 1230 according to a key data order.

In some embodiments, after receiving a predetermined threshold number of pieces of key-value data KV and their corresponding storage levels, the storage system 1200 (or associated processor) may determine whether the storage level of the key-value data KV is the highest storage level. In the following text, for ease of description and as an example, the highest storage level is referred to as a first level, and the non-highest storage level is referred to as a second level. As an example, the first level corresponds to the first memory 1210, and the second level corresponds to the second memory 1220. The second level may include at least one second sub-level, and each second sub-level corresponds to a second sub-memory 1220-1, . . . , or 1220-N.

Subsequently, as an example, the storage system 1200 (or associated processor) may determine the key-value data KV corresponding to the first level as first key-value data, and determine the key-value data KV corresponding to the second level as second key-value data. For example, the key-value data KV shown by a blank block in FIG. 2 may represent the first key-value data, and the key-value data KV shown by a diagonal shaded block may represent the second key-value data. In some embodiments, for the second key-value data, the storage system 1200 (or associated processor) may generate indicator data R according to its second sub-level (that is, the received storage level), and the indicator data R may indicate the second sub-memory 1220-1, . . . , or 1220-N where the second key-value data should be stored. Here, the size of the indicator data R generated by the received storage level may be less than the size of the data of the received storage level, thereby saving the storage space. For example, the received storage level may be a complex statement, while the generated indicator data may be a physical address of the secondary storage tree or the second sub-memory, or it may only be a numbered ID (such as an integer) of the secondary storage tree, for further saving the storage space and improving the storage efficiency. It should be understood that in other embodiments, the data of the received storage level may be directly used as the indicator data R.

Afterwards, in some embodiments, the dump from the in-memory table 1240 to the primary storage tree T1 and the dump from the in-memory table 1240 to the secondary storage trees T2-1, . . . , and T-N may be performed at the same time or at different times. The key-value data KV that has been dumped may be immediately deleted from the in-memory table 1240. As an example, during the dump to the primary storage tree T1, value data V in the second key-value data (shown by the diagonal shaded block) in the in-memory table 1240 may be replaced with the indicator data R to generate an associated data pair KR. Then, the first key-value data KV and the generated associated data pair KR may be dumped to a leaf node of the primary storage tree T1 according to the key data order, as shown by the primary storage tree T1 in FIG. 2. In addition, as an example, during the dump to the secondary storage trees T2-1, . . . , and T-N, the second key-value data corresponding to different second sub-levels may be dumped to different second sub-memories 1220-1, . . . , and 1220-N. For example, first key-value data KV shown by a diagonal shaded block in the in-memory table 1240 of FIG. 2 may be stored into the secondary storage tree T2-1 (located in the second sub-memory 1220-1), and indicator data R in a first associated data pair KR in the primary storage tree T1 may indicate the second sub-memory 1220-1 where the secondary storage tree T2-1 is located. Second key-value data KV shown by a diagonal shaded block in the in-memory table 1240 of FIG. 2 may be stored into a secondary storage tree between the secondary storage trees T2-1 and T2-N (located in a second sub-memory between the second sub-memories 1220-1 and 1220-N), and indicator data R in a second associated data pair KR in the primary storage tree T1 may indicate the second sub-memory in which the secondary storage tree is located. Third key-value data KV shown by a diagonal shaded block in the in-memory table 1240 of FIG. 2 may be stored into the secondary storage tree T2-N (located in the second sub-memory 1220-N), and indicator data R in a third associated data pair KR in the primary storage tree T1 may indicate the second sub-memory 1220-N where the secondary storage tree T2-N is located; and so on.

In some embodiments, after completing the dump to the primary storage tree T1 of the first memory and the secondary storage trees T2-1, . . . , and T-N of all the second sub-memories, the key-value data in the WAL file 1230 may be deleted. In addition, in some embodiments, if the dump is not completed and the dump is interrupted due to a power outage of the storage system 1200, the WAL file 1230 may be used for playing back key-value data that has not been dumped, so as to dump the key-value data that has not been dumped to the primary storage tree T1 or corresponding secondary storage trees T2-1, . . . , and T-N by storing it into the in-memory table 1240.

By using the above storage method, the first memory 1210 with the high storage performance may store the key data K of all the key-value data KV in the storage system, thereby establishing an association between the memory 1210 with high storage performance and the memory 1220 with low performance by the associated dataset pair KR. Therefore, by accessing only the first memory 1210 (or further accessing the in-memory table 1240 (in the presence of key-value data that has not been dumped)), the memories 1210, 1220-1, . . . , and 1220-N where the corresponding key-value data KR is stored may be known, thereby preventing the impact of the second memory 1220 with low performance on the overall performance of the storage system 1200 and greatly improving the efficiency of processing the key-value data. In addition, due to the small storage space occupied by the key data K and the indicator data R, the storage cost of the storage system 1200 will not be affected.

Figure 2B:
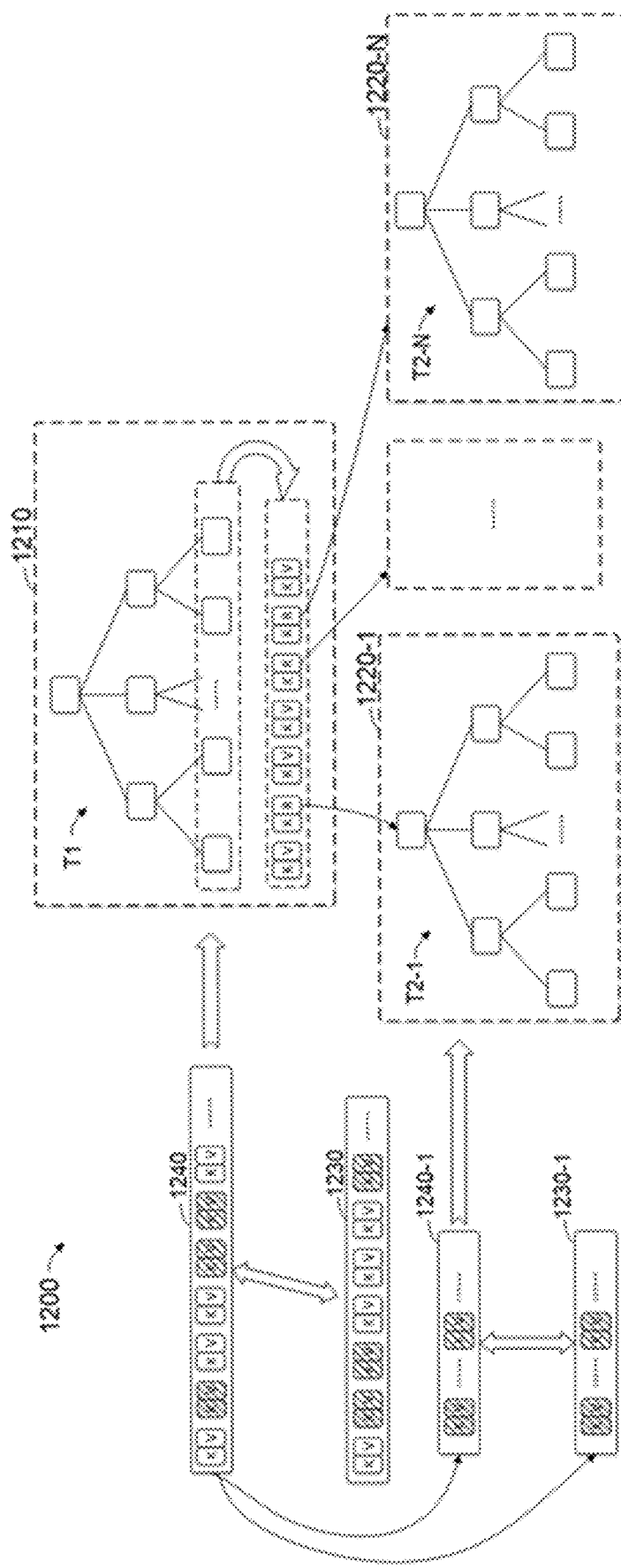
FIG. 2B shows a schematic block diagram of storing key-value data in a storage system according to another embodiment of the present disclosure.

In addition, due to the different processing speeds of the first memory 1210 and the second memory 1220, in order to further improve the efficiency of processing the key-value data, dump may be performed on the primary storage tree T1 and every secondary storage tree T2-1, . . . , and T-N independently. For example, in some embodiments, an independent sub-WAL file and an independent sub-in-memory table may be established for each secondary storage tree. For example, when the proportion of the second key-value data is less than a predetermined proportion threshold (such as 50%, 40%, 30%, 20%, 10%, or any other proportion value), the sub-WAL file and the sub-in-memory table for each secondary storage tree are established. FIG. 2B shows one such embodiment.

FIG. 2B shows a schematic block diagram of storing key-value data in a storage system 1200 according to another embodiment of the present disclosure. FIG. 2B only schematically shows a sub-WAL files 1230-1 and a sub-in-memory table 1240-1 established for the second sub-memory 1220-1. It should be understood that a similar sub-WAL file and sub-in-memory table may be established for another second sub-memory. In some embodiments, the sub-WAL file 1230-1 and the sub-in-memory table 1240-1 may include the second key-value data copied from the in-memory table 1240 that should be stored in the corresponding second sub-memory 1220-1. In some embodiments, the second key-value data in the sub-in-memory table 1240-1 may be dumped to the secondary storage tree T2-1 of the second sub-memory 1220-1 in a similar manner as described above with reference to FIG. 2A.

In this case, as an example, the in-memory table 1240 is only used for dumping to the primary storage tree T1. In some embodiments, after completing the dump to the primary storage tree T1, the key-value data in the WAL file 1230 may be deleted. After completing the dump to the corresponding second sub-memory 1240-1, the key-value data in the sub-WAL file 1230-1 may be deleted; and so on. In some embodiments, if the dump to the first memory or any second sub-memory is not completed and the dump is interrupted due to a power outage in the storage system 1200, the WAL file 1230 and the sub-WAL file (such as 1230-1) may be used for playing key-value data that has not been dumped, so as to dump the key-value data that has not been dumped to the primary storage tree or corresponding secondary storage tree by storing it in the in-memory table 1240 or corresponding sub-in-memory table (such as 1240-1).

In this way, after completing the dump to any memory, the corresponding WAL file (or sub-WAL file) may be deleted, thereby improving the utilization of the storage space of the storage system. In addition, during power outage play, only the data in the corresponding WAL file (or sub-WAL file) needs to be played back, without playing back the WAL files having all the key-value data, which can greatly reduce the amount of read data and further improve the data processing efficiency. In addition, due to the small proportion of the second key-value data, establishing the sub-WAL file and the sub-in-memory table will not significantly affect the write-in volume of the storage system.

FIG. 3 shows a schematic block diagram of operating key-value data in a storage system 1200 according to an embodiment of the present disclosure.

FIG. 3 shows an example of performing a delete operation and an edit operation on the stored key-value data KV after the key-value data KV is stored in the storage system 1200 as shown in FIG. 2A or FIG. 2B. For the delete operation, as an example, the storage system 1200 may receive key data K (the key data K as shown by the diagonal shaded block in FIG. 3) from any user terminal 1100, store the received key data K in the WAL file 1230 according to a receiving order, and store the received key data K in the in-memory table 1240 according to a key data order. For the edit operation, as an example, the storage system 1200 may receive key-value data KV (the key-value data KV as shown by the dot shaded block in FIG. 3) from any user terminal 1100, store the received key-value data KV in the WAL file 1230 according to a receiving order, and store it in the in-memory table 1240 according to the key data order. Then, a storage location of the key-value data to be operated in the storage system 1200 may be determined according to the key data K.

As an example, the received key data K may be compared with the key data K in the key-value data KV that has not been dumped in the in-memory table 1240. If there is key data K in the in-memory table 1240 that is consistent with the received key data K, it may be determined that the key-value data KV required by the user is located in the in-memory table 1240, and then corresponding processing, such as deletion or edition, may be performed on the key-value data KV in the in-memory table 1240. As an example, if there is no key data K in the in-memory table 1240 that is consistent with the received key data K, the received key data K may be compared with the key data K stored in the primary storage tree T1 in the memory 1210, and it may be determined whether the key data K that is located in the primary storage tree T1 and consistent with the received key data K is key data in the key-value data KV or key data in the associated data pair KR. If it is the key data in the key-value data KV, corresponding processing (such as deletion and edition) may be performed on the key-value data. If it is the key data in the associated data pair KR, the memory 1220-1, . . . , or 1220-N where the required key-value data is stored may be determined by the indicator data R, and then corresponding processing (such as deletion and edition) may be performed on the key-value data in the memory. It should be understood that in the presence of the sub-WAL files and the sub-in-memory tables as shown in FIG. 2B, the above operations may also be performed on sub-in-memory tables.

In addition, for a read operation, a process similar to that described above may also be performed, except that the storage system 1200 may receive key data K from any user terminal 1100, but does not store the key data K in the WLA file 1230 or the in-memory table 1240. Instead, the received key data K is directly compared with key data in the in-memory table 1240 (or a sub-in-memory table) or at least one in the primary storage tree T1, for locating key-value data to be read.

Through the above method, the required key-value data may be located only by accessing the first memory (or further accessing the in-memory table or sub-in-memory table), thereby being capable of greatly improving the efficiency of locating and subsequent processing of the required key-value data, and saving the I/O and computational costs of the storage system.

Especially, when a read operation is performed on a column of key-value data (also known as a data column), a plurality of pieces of key-value data may be read quickly and in batches by only using starting key data and ending key data according to a key data order in the data column, thereby further improving the efficiency of processing the key-value data. For example, the first key data K in the primary storage tree T1 of FIG. 3A may correspond to the starting key data, and the last key data K may correspond to the ending key data. By directly reading the key-value data KV between the two pieces of data and the key-value data corresponding to the associated data pair KR from the corresponding memory, the data column to be read may be quickly obtained. It should be understood that under the condition that the length of the data column is known, only the starting key data can be obtained, and the ending key data can be obtained through the starting key data. An illustrative example of reading the data column is specifically illustrated in the following FIG. 3B and FIG. 3C.

Figure 3A:
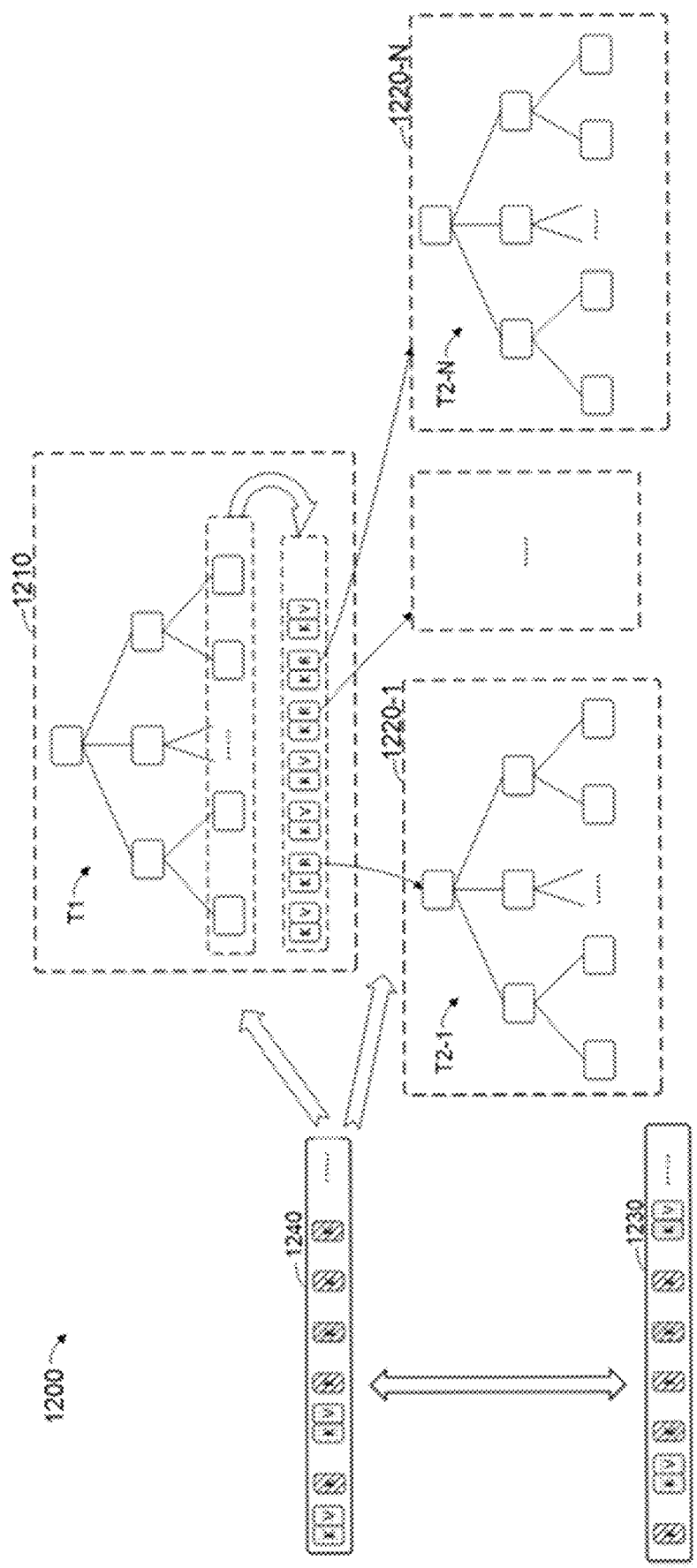
FIG. 3A shows a schematic block diagram of operating key-value data in a storage system according to an embodiment of the present disclosure.
Figure 3B:
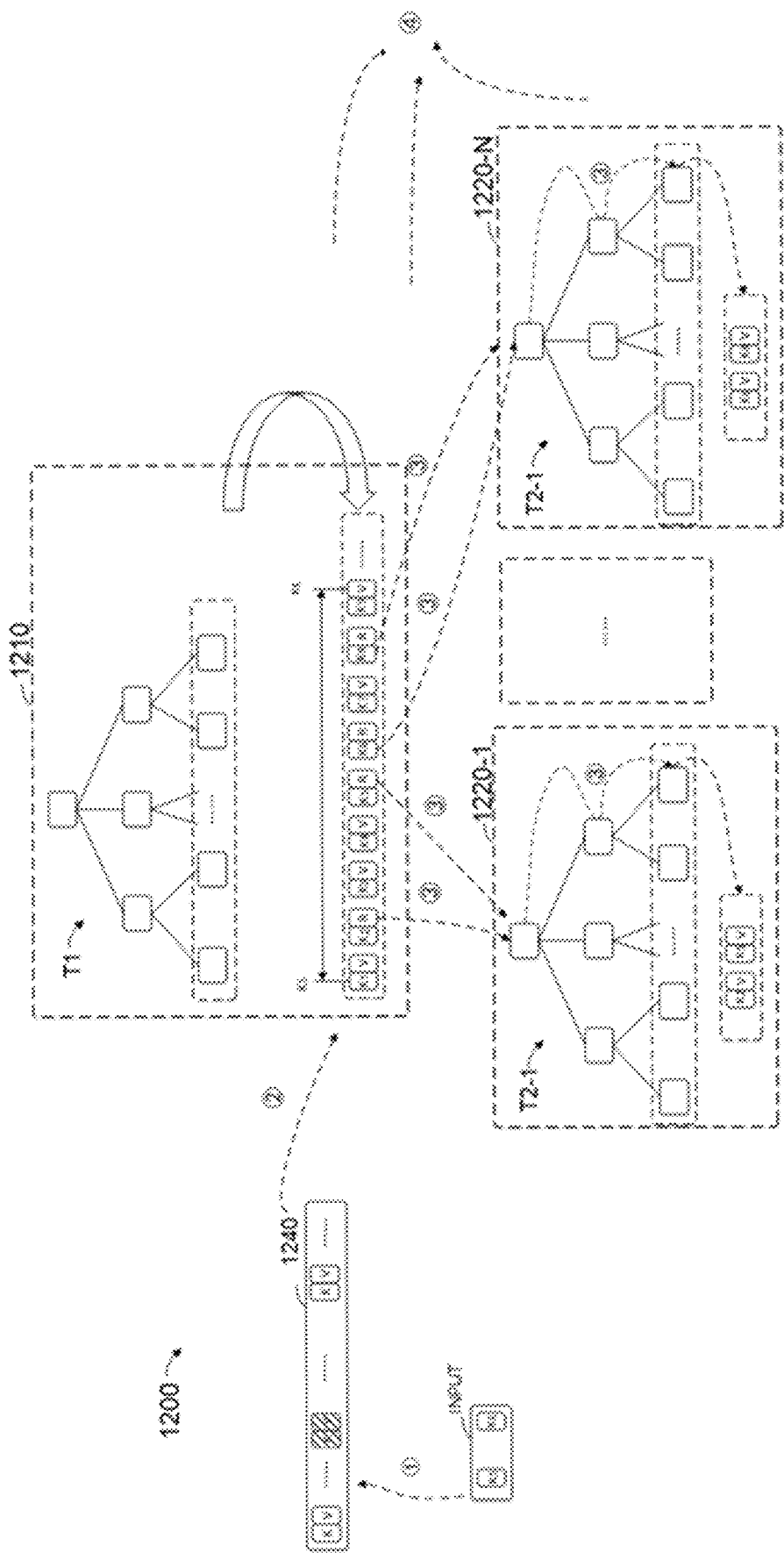
FIG. 3B shows a schematic block diagram of reading key-value data in a storage system according to an embodiment of the present disclosure.

FIG. 3B shows a schematic block diagram of reading key-value data in a storage system 1200 according to an embodiment of the present disclosure. In FIG. 3B, a process of reading a column of key-value data (or data column) is schematically indicated by dashed arrows represented by circled numbers. KS represents the starting key data of the data column, and KE represents the ending key data of the data column. As an example, the storage system 1200 may receive KS and KE as inputs INPUT from any user terminal 1100. After acquiring KS and KE, it may be determined, as shown by the arrow ①, whether there is key data within a range [KS, KE] in the in-memory table 1240. As shown in FIG. 3B, there is no key data within the range in the in-memory table 1240. It should be understood that in other embodiments, there may be a part of key data located within the range in the in-memory table 1240. In this case, it may be determined that key-value data corresponding to the part of key data needs to be read from the in-memory table 1240.

Next, as an example, the key data within the range [KS, KE] in the primary storage tree T1 may be determined as shown by the arrow ②. In FIG. 3B, key data K1 to K9 in the primary storage tree T1 are within the range [KS, KE], and therefore, the key-value data KV having the key data within the range [K1, K9] needs to be read. As shown in FIG. 3B, key-value data K1V, K3V, K4V, K7V, and K9V need to be read from the primary storage tree T1, and key data K2, K5, K6, and K8 are associated with the indicator data R. Therefore, as shown by the arrow ③, according to indication of the corresponding indicator data R, the key-value data K2V and K5V may be read from the secondary storage tree T2-1, and the key-value data K6V and K8V may be read from the secondary storage tree T2-N. By using the above method, all key-value data (that is, data column) having key data within the range [KS, KE] may be read. Afterwards, the read key-value data may be output once or in batches as shown by the arrow ④.

It should be understood that the example in FIG. 3B also applies to the reading of single or a plurality of discontinuous pieces of key-value data. In this case, the only difference is that for each piece of key data K included in the input INPUT, as shown by the arrow ①, it is determined whether the key data exists in the in-memory table 1240. If it does not exist, as shown by the arrow ②, it is determined whether the key data consistent with the key data in the primary storage tree T1 is associated with the value data V or the indicator data R. If it is associated with the indicator data R, as shown by arrow ③, the key-value data is read from the corresponding auxiliary memory. Afterwards, as an example, the read key-value data may be output once or in batches as shown by the arrow ④.

Figure 3C:
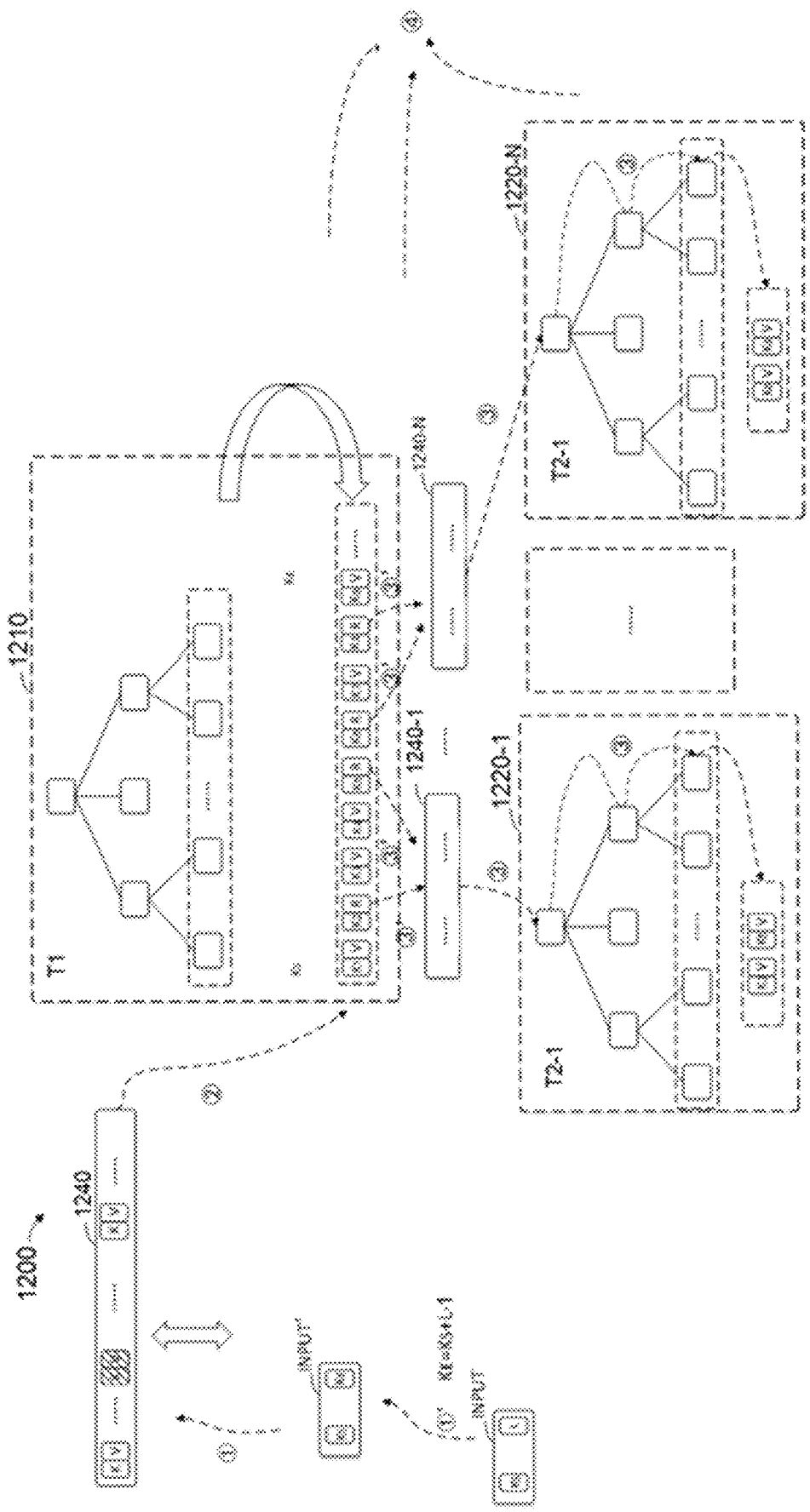
FIG. 3C shows a schematic block diagram of reading key-value data in a storage system according to another embodiment of the present disclosure.

FIG. 3C shows a schematic block diagram of reading key-value data in a storage system according to another embodiment of the present disclosure. The difference between FIG. 3C and FIG. 3B is that in the example of FIG. 3C, the storage system 1200 may receive the starting key data KS and the list length L as inputs INPUT from any user terminal 1100 (without obtaining the ending key data KE). Then, as an example, the ending key data KE may be determined by an equation KE=KS+L−1 as shown by the arrow ①, and the determined KE and the received KS may be used as new inputs INPUT' to perform the subsequent process similar to FIG. 3B. In addition, in some embodiments, another difference between FIG. 3C and FIG. 3B is that the example of FIG. 3C further has sub-in-memory tables 1240-1, . . . , and 1240-N, and as shown by arrow ③, it is determined whether there is key data within the range [KS, KE] in the corresponding sub-in-memory tables 1240-1 and 1240-N, and then as shown by arrow ③, the key-value data is read from the corresponding secondary storage tree.

Figure 4:
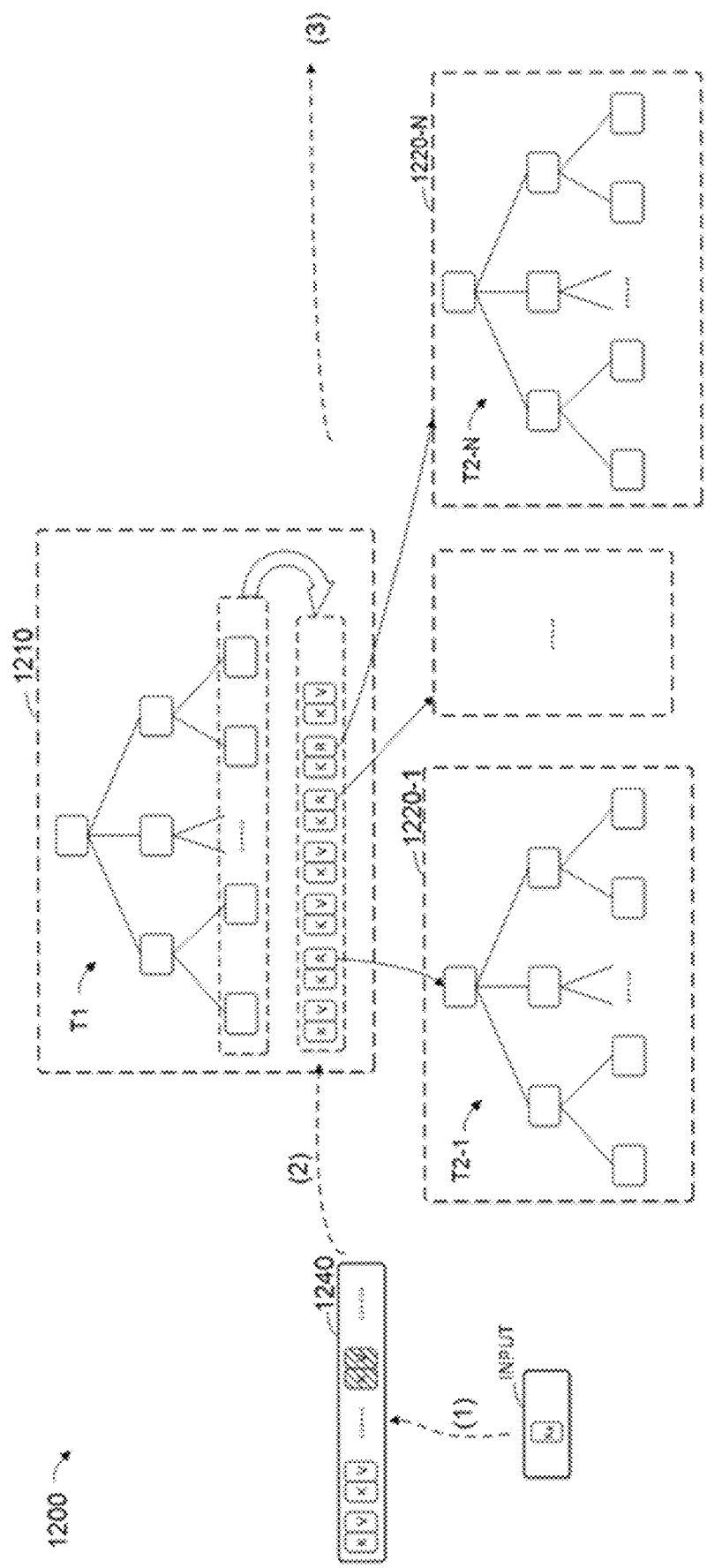
FIG. 4 shows a schematic block diagram of searching for key-value data in a storage system according to an embodiment of the present disclosure.

FIG. 4 shows a schematic block diagram of searching for key-value data in a storage system 1200 according to an embodiment of the present disclosure.

FIG. 4 shows an example of performing a search operation for stored key-value data KV after the key-value data KV is stored in the storage system 1200 as shown in FIG. 2A or FIG. 2B.

For the searching operation, as an example, the storage system 1200 may receive key data KX as an input INPUT from any user terminal 1100. It should be understood that in other embodiments, the input INPUT may include more key data. Then, as an example, it may be determined according to key data KX whether the searched key-value data is stored in the storage system 1200.

As an example, the received key data KX may be compared with the key data K in the key-value data KV that has not been dumped in the in-memory table 1240 (for example, as shown by the arrow (1) in FIG. 4). If there is key data in the in-memory table 1240 that is consistent with the received key data KX, it may be determined that the searched key-value data exists (for example, the searching result may be output as shown by the arrow (3) in FIG. 4). As an example, if there is no key data K in the in-memory table 1240 that is consistent with the received key data KX, the received key data KX may be compared with the key data K stored in the primary storage tree T1 in the memory 1210 (for example, as shown by the arrow (2) in FIG. 4). If there is key data in the primary storage tree T1 that is consistent with the received key data KX (regardless of whether the key data K is the key data in the key-value data KV or the key data in the associated data pair KR), it may be determined that the searched key-value data exists (for example, the searching result may be output as shown by the arrow (3) in FIG. 4). When it is determined that there is no key data consistent with the received key data KX in the primary storage tree T1, the searching result that no related key-value data is found through searching may be output as shown by the arrow (3) in FIG. 4. It should be understood that in the presence of the sub-WAL files and the sub-in-memory tables as shown in FIG. 2B, the above operations may also be performed on sub-in-memory tables.

For this type of processing operation that only requires key data K (Key-only), there is no need to perform any operation on the memory 1220 with a low access speed, and therefore, the processing efficiency of processing key-value data may be further improved.

FIG. 2A to FIG. 4 only show some examples of processing methods for the key-value data KV according to the embodiments of the present application. It should be understood that any other processing may be performed on the key-value data KV by using the above methods.

Figure 5:
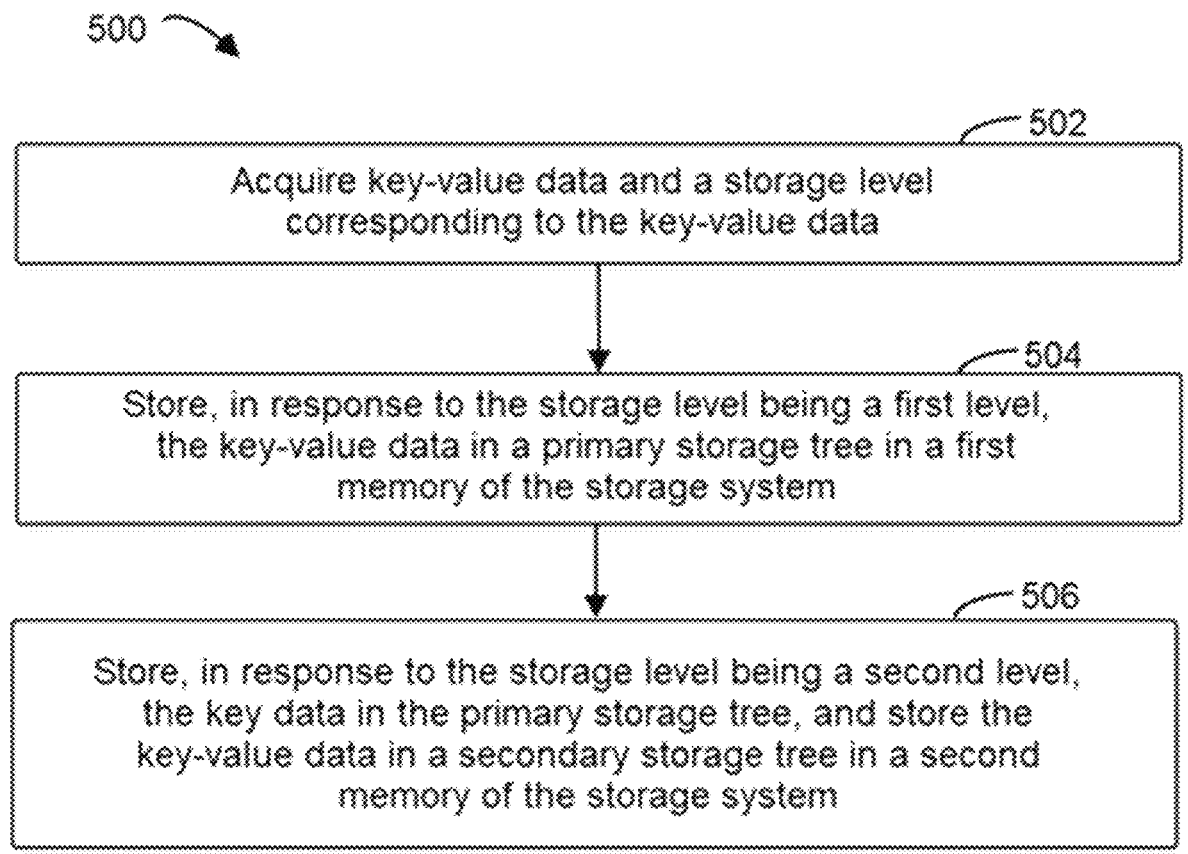
FIG. 5 shows a flow chart of a method for processing key-value data according to an embodiment of the present disclosure.

FIG. 5 shows a flow chart 500 of a method for processing key-value data according to an embodiment of the present disclosure.

Referring to FIG. 5, at block 502, key-value data KV and a storage level corresponding to the key-value data are acquired, wherein the key-value data includes key data K and value data V. In some embodiments, the storage level may be a first level or a second level, and the first level may be higher than the second level. In some embodiments, the first level may be the highest storage level and corresponds to a first memory 1210 in a storage system, and the first memory has a primary storage tree T1. The second level may be a non-highest storage level and corresponds to a second memory 1220 in the storage system. The second level may include at least one second sub-level, and the second memory may include at least one second sub-memory. There is a one-to-one correspondence between the at least one second sub-level and the at least one second sub-memory. Each second sub-memory may have a corresponding secondary storage tree T2-1, ..., or T-N. In some embodiments, both the primary storage tree and each secondary storage tree are B+ trees. In some embodiments, the first level and the at least one second sub-level are used for indicating different storage performance of different memories in the storage system. For example, it is as described above with reference to FIG. 1 to FIG. 4.

At block 504, in response to the storage level being the first level, the key-value data KV is stored in the primary storage tree T1 in the first memory of the storage system. At 506, in response to the storage level being the second level, the key data K is stored in the primary storage tree T1, and the key-value data KV is stored in the secondary storage trees T2-1, ..., and T-N in the second memory of the storage system.

In some embodiments, the storage system may further include: a write ahead log (WAL) file 1230 and an in-memory table 1240. The WAL file 1230 may be located in a predetermined non-volatile memory in the storage system 1200, and the in-memory table 1240 may be located in a predetermined volatile memory in the storage system 1200. In this case, in some embodiments, the method for processing key-value data according to the embodiment of the present disclosure may further include: storing the key-value data KV in the WAL file 1230 according to an acquisition order. In some embodiments, the method may further include: storing the key-value data KV in the in-memory table 1240 according to a key data order for the key data. In some embodiments, the method may further include: determining whether a dump condition for dumping from the in-memory table 1240 to the first memory 1210 and at least one second sub-memory 1220-1, ..., and 1220-N is met, wherein the dump condition is the number of pieces of key-value data stored in the in-memory table 1240 reaching a predetermined threshold. In some embodiments, the method may further include: determining, for each piece of key-value data KV in the in-memory table when it is determined that the dump condition is met, whether the corresponding storage level is the first level or the second level. Afterwards, the above blocks 504 and 506 may be performed.

Alternatively, in some embodiments, the following operation may also be performed before performing the above blocks 504 and 506: determining, for every piece of key-value data KV stored in the memory table 1240, the key-value data corresponding to the first level as first key-value data (as shown in the blank block in FIG. 2), and determining the key-value data corresponding to the second level as second key-value data (as shown by the diagonal shaded block in FIG. 2). In some embodiments, the method may further include: generating, for each piece of second key-value data, indicator data R according to the second sub-level corresponding to the second key-value data, for generating an associated data pair KR composed of key data K in the second key-value data and the indicator data. The indicator data R indicates a second sub-memory in which the second key-value data should be stored. In this case, in some embodiments, at block 504, every piece of first key-value data KV and every associated data pair KR may be dumped to the primary storage tree T1 in the first memory 1210 according to the key data order. At block 506, every piece of second key-value data may be dumped, according to the key data order, to the secondary storage trees T2-1, ..., and T-N in the second sub-memories 1220-1, ..., and 1220-N indicated by the corresponding indicator data R.

In some embodiments, after completing the dump to the first memory 1210 and the second sub-memories 1220-1, . . . , and 1220-N, the key-value data KV in the WAL file 1230 may be deleted. In some embodiments, in a case where the dump has not been completed and the dump is interrupted due to a power outage in the storage system 1200, the WAL file 1230 may be used for playing back key-value data KR that has not been dumped, so as to dump the key-value data KR that has not been dumped to the primary storage tree T1 or corresponding secondary storage trees T2-1, . . . , and T-N by storing it in the in-memory table 1240.

In addition, in some embodiments, for reducing play-back costs while not significantly increasing the workload of writing, the method may further include determining whether the proportion of all second key-value data in the in-memory table 1240 is less than a predetermined proportion threshold. In some embodiments, the method may further include establishing a sub-WAL file and a sub-in-memory table corresponding to each second sub-memory 1220-1, . . . , and 1220-N in response to determining that the proportion is less than the predetermined proportion threshold. In some embodiments, each sub-WAL file and the corresponding sub-in-memory table include the second key-value data that is copied from the in-memory table 1240 and should be stored in the corresponding second sub-memory. In this case, in some embodiments, at block 506, for each second sub-memory, every piece of second key-value data in the corresponding sub-in-memory table may be dumped to the secondary storage trees in the second sub-memory.

In this case, in some embodiments, the key-value data in the WAL file may be deleted after completing the dump to the first memory 1210. After completing the dump to the corresponding second sub-memory, the key-value data in the corresponding sub-WAL file is deleted. In a case where the dump to the first memory 1210 or any second sub-memory 1220-1, . . . , and 1220-N is not completed and the dump is interrupted due to a power outage in the storage system 1200, the WAL file 1230 and the sub-WAL file (such as 1230-1) may be used for playing the key-value data KV that has not been dumped, so as to dump the key-value data KV that has not been dumped to the primary storage tree T1 or corresponding secondary storage trees T2-1, . . . , and T-N by storing it into the in-memory table 1240 or corresponding sub-in-memory table (such as 1240-1). It is as described above with reference to FIG. 2A and FIG. 2B.

After the key-value data is stored as mentioned above, any operation may be performed on the stored key-value data. In some embodiments, the method for processing key-value data according to an embodiment of the present disclosure may further include: acquiring operation key data K in operation key-value data KV that needs to be operated in the storage system 1200. In some embodiments, the method may further include determining a storage location of the operation key-value data KV in the storage system 1200 according to the operation key data K. In some embodiments, the method may further include operating the key-value data KV at the storage location. In some embodiments, the storage location may include the in-memory table 1240 (or sub-in-memory table). In some embodiments, the storage location may include the primary storage tree T1. In some embodiments, the storage location may include secondary storage trees T2-1, . . . , and T-N in at least one of the second sub-memories 1220-1, . . . , and 1220-N.

In some embodiments, the storage location of the operation key-value data KV in the storage system 1200 may be determined based on whether the key-value data K corresponding to the operation key data K exists in the in-memory table 1240 (or sub-in-memory table). In some embodiments, the storage location of the operation key-value data KV in the storage system 1200 may be determined based on whether the key-value data KV corresponding to the operation key data K exists in the primary storage tree T1. In some embodiments, the storage location of the operation key-value data KV in the storage system 1200 may be determined based on the secondary storage tree of the second memory indicated by the indicator data R corresponding to the operation key data K in the primary storage tree T1. In addition, in some embodiments, the operation key-value data may include a column of operation key-value data, and the operation key data may include starting key data and ending key data of the column of operation key-value data according to the key data order. In this case, in some embodiments, the storage location of the column of operation key-value data in the storage system 1200 may further be determined based on the starting key data and ending key data. In some embodiments, the above operations may include a read operation. In some embodiments, the above operations may include a delete operation. In some embodiments, the above operations may include an edit operation. In some embodiments, in a case where the above operations may include a read operation, in some embodiments, after all the key-value data is read, the read key-value data may be output. In some embodiments, after a predetermined amount of key-value data is read, the read key-value data may be output. For example, as described above with reference to FIG. 3.

After the key-value data is stored as mentioned above, any other operation may be performed on the stored key-value data. In some embodiments, the method for processing key-value data according to an embodiment of the present disclosure may further include: acquiring searching key data K for searching key-value data KV to be searched for. In some embodiments, the method may further include determining whether key data consistent with the searching key data K is included in the in-memory table 1240 (or sub-in-memory table) or the primary storage tree T1. In some embodiments, the method may further include determining, in a case of determining that the key data consistent with the searching key data is included, that the searching key-value data KV is found through searching in the storage system 1200.

The method for processing key-value data according to the embodiments of the present disclosure can establish associations between different memories in the storage system through the key data in the key-value data, so that in the process of locating the key-value data required by a user, only the memory with high storage performance needs to be operated, without operating the memory with low storage performance. This can greatly improve the efficiency of locating and subsequently processing the key-value data, and improve the overall performance of the storage system.

Figure 6:
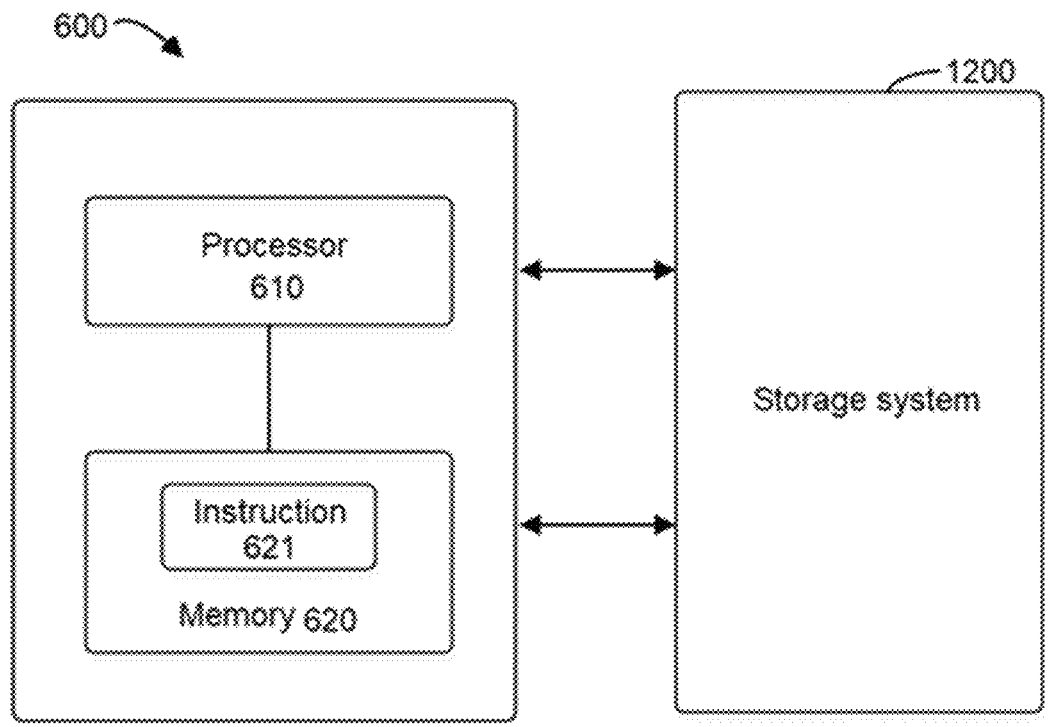
FIG. 6 shows a block diagram of an electronic device for processing key-value data according to an embodiment of the present disclosure.

FIG. 6 shows a block diagram of an electronic device 600 for processing key-value data according to an embodiment of the present disclosure. The electronic device 600 shown in FIG. 6 may interact with the storage system 1200 or be integrated in the storage system 1200. For example, the electronic device 600 may be a user terminal 1100 shown in FIG. 1, or a processor in the storage system 1200.

The electronic device 600 may include at least one processor 610 and a memory 620. The memory 620 is coupled to the at least one processor 610 and has instructions 621 stored thereon. The instructions 621, when executed by the at least one processor 610, cause the electronic device 600 to perform the following actions: acquiring key-value data and a storage level corresponding to the key-value data, wherein the key-value data includes key data and value data; storing, in response to the storage level being a first level, the key-value data in a primary storage tree in a first memory of a storage system; and storing, in response to the storage level being a second level, the key data in the primary storage tree, and storing the key-value data in a secondary storage tree in a second memory of the storage system, wherein the first level is higher than the second level.

In some embodiments, the first level is the highest storage level, and the second level includes at least one second sub-level, wherein the second memory includes at least one second sub-memory, there is a one-to-one correspondence between the at least one second sub-level and the at least one second sub-memory, and each second sub-memory has a corresponding secondary storage tree, and wherein the first level and at least one second sub-level are used for indicating different storage performances of different memories in the storage system.

In some embodiments, the primary storage tree and each secondary storage tree are both B+ trees. The storage system further includes: a write ahead log (WAL) file and an in-memory table. The WAL file is located in a predetermined non-volatile memory in the storage system, and the in-memory table is located in a predetermined volatile memory in the storage system.

In some embodiments, the actions performed by the electronic device 600 may further include: storing the key-value data in the WAL file according to an acquisition order; storing the key-value data in the in-memory table according to a key data order for the key data; determining whether a dump condition for dumping from the in-memory table to the first memory and the at least one second sub-memory is met, wherein the dump condition is the number of pieces of key-value data stored in the in-memory table reaching a predetermined threshold; and determining, for each piece of key-value data in the in-memory table in a case of determining that the dump condition is met, whether the corresponding storage level is the first level or the second level.

In some embodiments, the actions performed by the electronic device 600 may further include: determining, for every piece of key-value data stored in the storage table, the key-value data corresponding to the first level as first key-value data, and determining the key-value data corresponding to the second level as second key-value data; and generating, for each piece of second key-value data, indicator data according to the second sub-level corresponding to the second key-value data to generate an associated data pair composed of key data in the second key-value data and the indicator data. The indicator data indicates a second sub-memory in which the second key-value data should be stored. In this case, in some embodiments, according to the key data order, every piece of first key-value data and every associated data pair are dumped to the primary storage tree in the first memory; and according to the key data order, every piece of second key-value data is dumped to a secondary storage tree in a second sub-memory indicated by the corresponding indicator data.

In addition, the electronic device 600 may further perform any other operation described above with reference to FIG. 1 to FIG. 5.

The electronic device for processing key-value data according to the embodiments of the present disclosure can establish associations between different memories in the storage system through the key data in the key-value data, so that in the process of locating the key-value data required by a user, only the memory with high storage performance needs to be operated, without operating the memory with low storage performance. This can greatly improve the efficiency of locating and subsequently processing the key-value data, and improve the overall performance of the storage system.

Figure 7:
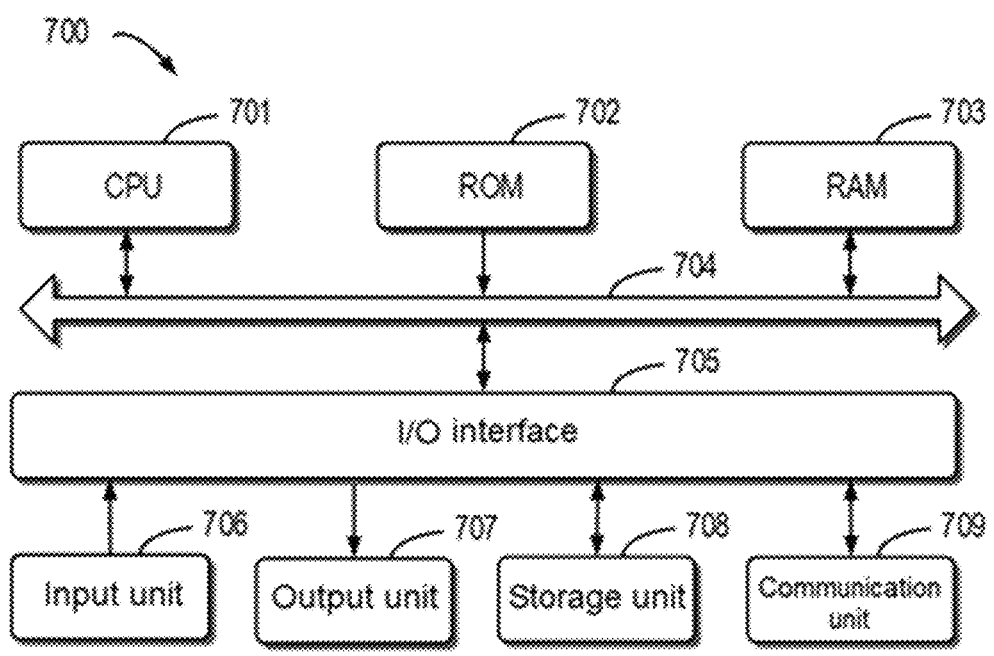
FIG. 7 shows a schematic block diagram of an example of an example device suitable for implementing embodiments of the present disclosure.

FIG. 7 illustrates a schematic block diagram of an example device 700 which can be used to implement embodiments of the present disclosure. The electronic device in FIG. 6 can be implemented using the device 700. As shown in the figure, the device 700 includes a central processing unit (CPU) 701 that may execute various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The CPU 701, the ROM 702, and the RAM 703 are connected to each other through a bus 704. An Input/Output (I/O) interface 705 is also connected to the bus 704.

A plurality of components in the device 700 are connected to the I/O interface 705, including an input unit 706, such as a keyboard and a mouse; an output unit 707, such as various types of displays and speakers; a storage unit 708, such as a disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

The various processes and processing described above, for example, the method 500, may be performed by the processing unit 701. For example, in some embodiments, the method 500 may be implemented as a computer software program that is tangibly included in a machine-readable medium, such as the storage unit 708. In some embodiments, part or all of the computer program may be loaded and/or installed onto the device 700 via the ROM 702 and/or the communication unit 709. When the computer program is loaded into the RAM 703 and executed by the CPU 701, one or more actions of the method 500 described above may be executed.

The present disclosure may be a method, an apparatus, a system, and/or a computer program product. The computer program product may include a computer-readable storage medium on which computer-readable program instructions for performing various example embodiment of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various example embodiments of the present disclosure.

Various example embodiments of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various example embodiments of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms used herein is intended to best explain the principles and practical applications of the various embodiments or the technological improvements to technologies on the market, or to enable other persons of ordinary skill in the art to understand the embodiments disclosed herein.

What is claimed is:

1. A method, comprising:
    acquiring, by a system comprising a processor, first key-value data and a first storage level corresponding to the first key-value data, wherein the first key-value data comprises first key data and first value data, and the first storage level indicates a first storage performance level of a memory in a storage system;
    determining that the first storage level is a first level;
    in response to the first storage level being determined to be the first level, storing the first key-value data in a primary storage tree in a first memory of the storage system;
    acquiring second key-value data and a second storage level corresponding to the second key-value data, wherein the second key-value data comprises second key data and second value data, and the second storage level indicates a second storage performance level of the memory in the storage system;

determining that the second storage level is a second level that is different than the first level;

in response to the second storage level being determined to be the second level, storing the second key data in the primary storage tree, and storing the second key-value data in a secondary storage tree in a second memory of the storage system, wherein the first level is higher than the second level.

2. The method according to claim 1, wherein the first level is a highest storage level, wherein the second level comprises at least one second sub-level lower than the highest storage level, wherein the second memory comprises at least one second sub-memory lower than the highest storage level, wherein there is a one-to-one correspondence between the at least one second sub-level and the at least one second sub-memory, wherein each second sub-memory has a corresponding secondary storage tree, and wherein the first level and the at least one second sub-level are used for indicating different storage performance of different memories in the storage system.

3. The method according to claim 2, wherein the primary storage tree and each secondary storage tree are B+ trees, wherein the storage system further comprises: a write ahead log (WAL) file and an in-memory table, wherein the WAL file is located in a specified non-volatile memory in the storage system, and wherein the in-memory table is located in a specified volatile memory in the storage system.

4. A device, comprising:

at least one processor; and a memory coupled to the at least one processor and having instructions stored thereon, wherein the instructions, when executed by the at least one processor, cause the device to perform operations comprising:

acquiring key-value data and a storage level corresponding to the key-value data, wherein the key-value data comprises key data and value data, and the storage level indicates a storage performance level of a memory in a storage system;

storing, in response to the storage level being determined to be a first level, the key-value data in a primary storage tree in a first memory of the storage system; and in response to the storage level being determined to be a second level, storing the key data in the primary storage tree, and storing the key-value data in a secondary storage tree in a second memory of the storage system, wherein the first level is higher than the second level.

5. The electronic device according to claim 4, wherein the first level is a highest storage level, and the second level comprises at least one second sub-level lower than the highest level, wherein the second memory comprises at least one second sub-memory, there is a one-to-one correspondence between the at least one second sub-level and the at least one second sub-memory, and each second sub-memory has a corresponding secondary storage tree, and wherein the first level and the at least one second sub-level are used for indicating different storage performance of different memories in the storage system.

6. The electronic device according to claim 5, wherein the primary storage tree and each secondary storage tree are B+ trees, wherein the storage system further comprises: a write ahead log (WAL) file and an in-memory table, wherein the WAL file is located in a specified non-volatile memory in the storage system, and wherein the in-memory table is located in a specified volatile memory in the storage system.

7. The electronic device according to claim 6, wherein the operations further comprise:

storing the key-value data in the WAL file according to an acquisition order;

storing the key-value data in the in-memory table according to a key data order for the key data;

determining whether a dump condition for dumping from the in-memory table to the first memory and the at least one second sub-memory is satisfied, wherein the dump condition is present when the number of pieces of key-value data stored in the in-memory table reaches at least a specified threshold; and determining, for each piece of key-value data in the in-memory table for which the dump condition is satisfied, whether the corresponding storage level is the first level or the second level.

8. The electronic device according to claim 7, wherein the operations further comprise:

determining, for each piece of key-value data stored in the storage table, the key-value data corresponding to the first level as first key-value data, and determining the key-value data corresponding to the second level as second key-value data; and generating, for each piece of second key-value data, indicator data according to the second sub-level corresponding to the second key-value data to generate an associated data pair composed of key data in the second key-value data and the indicator data, wherein the indicator data indicates a second sub-memory in which the second key-value data should be stored, wherein according to the key data order, each piece of first key-value data and each associated data pair are dumped to the primary storage tree in the first memory; and according to the key data order, each piece of second key-value data is dumped to a secondary storage tree in a second sub-memory indicated by the corresponding indicator data.

9. The electronic device according to claim 8, wherein the operations further comprise:

deleting the key-value data in the WAL file after completing the dump to the first memory and all second sub-memories, wherein in a case where the dump is not completed and the dump is interrupted due to a power outage in the storage system, the WAL file is used for playing back the key-value data that has not been dumped, resulting in dumping of the key-value data that has not been dumped to the primary storage tree or the corresponding secondary storage tree by storing the key-value data that has not been dumped to the primary storage tree or the corresponding secondary storage tree in the in-memory table.

10. The electronic device according to claim 8, wherein the operations further comprise:

determining whether a proportion of all the second key-value data in the in-memory table is less than a defined proportion threshold; and establishing, in response to determining that the proportion is less than the defined proportion threshold, a sub-WAL file and a sub-in-memory table corresponding to each second sub-memory, wherein each sub-WAL file and the corresponding sub-in-memory table comprise the second key-value data that is copied from the in-memory table and is designated to be stored in the corresponding second sub-memory.

11. The electronic device according to claim 10, wherein dumping, according to the key data order, each piece of second key-value data to a secondary storage tree in a second sub-memory indicated by the corresponding indicator data comprises:

dumping, for each second sub-memory, each piece of second key-value data in the corresponding sub-in-memory table to the secondary storage tree in the second sub-memory.

12. The electronic device according to claim 10, wherein the operations further comprise:

deleting the key-value data in the WAL file after completing the dump to the first memory; and deleting the key-value data in the corresponding sub-WAL file after completing the dump to the corresponding second sub-memory, wherein in a case where the dump to the first memory or any second sub-memory is not completed and the dump is interrupted due to a power outage in the storage system, the WAL file and the sub-WAL file are used for playing back the key-value data that has not been dumped, resulting in dumping the key-value data that has not been dumped to the primary storage tree or the corresponding secondary storage tree by storing the key-value data that has not been dumped to the primary storage tree or the corresponding secondary storage tree in the in-memory table or corresponding sub-in-memory table.

13. The electronic device according to claim 8, wherein the operations further comprise:

acquiring operation key data from operation key-value data on which the storage system is to operate;

determining a storage location of the operation key-value data in the storage system according to the operation key data, wherein the storage location comprises at least one of the in-memory table, the primary storage tree, or the secondary storage tree in the at least one second sub-memory; and operating the key-value data at the storage location, wherein the storage location of the operation key-value data in the storage system is determined based on at least one of:

a first result of determining whether there is any key-value data corresponding to the operation key data in the in-memory table, a second result of determining whether there is any key-value data corresponding to the operation key data in the primary storage tree, or the secondary storage tree of the second memory indicated by the indicator data corresponding to the operation key data in the primary storage tree.

14. The electronic device according to claim 13, wherein the operation key-value data comprises a column of operation key-value data, wherein the operation key data comprises starting key data and ending key data of the column of operation key-value data according to the key data order, and wherein the storage location of the column of operation key-value data in the storage system is further determined based on the starting key data and the ending key data.

15. The electronic device according to claim 14, wherein the operation comprises at least one of: a read operation, a delete operation, or an edit operation, wherein in a case where the operation comprises the read operation, the operating the key-value data at the storage location comprises:

after reading all key-value data, outputting the read key-value data; or after reading a specified amount of key-value data, outputting the read key-value data.

16. The electronic device according to claim 8, wherein the operations further comprise:

acquiring searching key data of searching key-value data corresponding to a search to be performed;

determining whether at least one of the in-memory table or the primary storage tree comprises key data consistent with the searching key data; and determining, in a case of determining that the key data consistent with the searching key data is comprised by at least one of the in-memory table or the primary storage tree, that the searching key-value data has been found through searching in the storage system.

17. A computer program product, the computer program product being tangibly stored on a non-transitory computer-readable medium and comprising machine-executable instructions, wherein the machine-executable instructions, when executed, cause a machine to:

acquire key-value data and a storage level corresponding to the key-value data, wherein the key-value data comprises key data and value data, and the storage level indicates a storage performance level of a memory in a storage system;

store, in response to the storage level being a first level, the key-value data in a primary storage tree in a first memory of the storage system; and store, in response to the storage level being a second level, the key data in the primary storage tree, and store, in further response to the storage level being the second level, the key-value data in a secondary storage tree in a second memory of the storage system, wherein the first level is higher than the second level.

18. The computer program product according to claim 17, wherein the first level is a highest storage level, and the second level comprises at least one second sub-level lower than the highest level, wherein the second memory comprises at least one second sub-memory, there is a one-to-one correspondence between the at least one second sub-level and the at least one second sub-memory, and each second sub-memory has a corresponding secondary storage tree, and wherein the first level and the at least one second sub-level are used for indicating different storage performance of different memories in the storage system.

19. The computer program product according to claim 18, wherein the primary storage tree and each secondary storage tree are B+ trees, wherein the storage system further comprises: a write ahead log (WAL) file and an in-memory table, wherein the WAL file is located in a specified non-volatile memory in the storage system, and wherein the in-memory table is located in a specified volatile memory in the storage system.

20. The computer program product according to claim 19, wherein the machine-executable instructions, when executed, further cause the machine to:
- store the key-value data in the WAL file according to an acquisition order;
- store the key-value data in the in-memory table according to a key data order for the key data;
- determine whether a dump condition for dumping from the in-memory table to the first memory and the at least one second sub-memory is satisfied, wherein the dump condition is present when the number of pieces of key-value data stored in the in-memory table reaches at least a specified threshold; and
- determine, for each piece of key-value data in the in-memory table for which the dump condition is satisfied, whether the corresponding storage level is the first level or the second level.

* * * * *